(12) United States Patent
Yun

(10) Patent No.: US 11,827,183 B2
(45) Date of Patent: Nov. 28, 2023

(54) LIFTING MULTI-JOINT ROOF CARRIER FOR VEHICLE

(71) Applicant: Nam Ho Yun, Mokpo (KR)

(72) Inventor: Nam Ho Yun, Mokpo (KR)

( * ) Notice: Subject to any disclaimer, the term of this patent is extended or adjusted under 35 U.S.C. 154(b) by 72 days.

(21) Appl. No.: 17/619,988

(22) PCT Filed: Jun. 24, 2020

(86) PCT No.: PCT/KR2020/008209
§ 371 (c)(1),
(2) Date: Dec. 16, 2021

(87) PCT Pub. No.: WO2020/262953
PCT Pub. Date: Dec. 30, 2020

(65) Prior Publication Data
US 2022/0355741 A1    Nov. 10, 2022

(30) Foreign Application Priority Data

| Jun. 25, 2019 | (KR) | 10-2019-0075679 |
| Jul. 12, 2019 | (KR) | 10-2019-0084789 |
| Aug. 12, 2019 | (KR) | 10-2019-0098445 |
| May 4, 2020 | (KR) | 10-2020-0053142 |

(51) Int. Cl.
*B60R 9/042* (2006.01)
*B60R 9/045* (2006.01)

(52) U.S. Cl.
CPC .............. *B60R 9/042* (2013.01); *B60R 9/045* (2013.01)

(58) Field of Classification Search
CPC ................................ B60R 9/042; B60R 9/045
See application file for complete search history.

(56) References Cited

U.S. PATENT DOCUMENTS

| 4,439,086 | A | * | 3/1984 | Thede | B60R 9/08 224/310 |
| 5,104,280 | A | * | 4/1992 | Ziaylek | B60R 9/0423 280/4 |
| 5,423,650 | A | * | 6/1995 | Zerbst | B60R 9/042 224/310 |
| 5,884,824 | A | * | 3/1999 | Spring, Jr. | B60R 9/042 224/325 |
| 6,092,972 | A | * | 7/2000 | Levi | B60R 9/0423 224/310 |
| 6,179,543 | B1 | * | 1/2001 | Adame | B60R 9/0423 224/310 |

(Continued)

FOREIGN PATENT DOCUMENTS

| JP | 2005-053403 A | 3/2005 |
| JP | 2013-220787 A | 10/2013 |

(Continued)

*Primary Examiner* — Brian D Nash
(74) *Attorney, Agent, or Firm* — Heedong Chae; Lucem, PC

(57) ABSTRACT

The present invention relates to a carrier installed on the roof of a vehicle such as a car or SUV and to a lifting multi-joint roof carrier for a vehicle, which is used to easily load or unload an object on or from a vehicle roof. The present invention relates to a lifting multi-joint roof carrier for a vehicle, which is vertically movable up, rotatable, etc. in a process of loading or unloading cargo, to allow an object to be smoothly loaded or unloaded and have a structure with an aesthetically pleasing appearance.

11 Claims, 14 Drawing Sheets

(56) References Cited

U.S. PATENT DOCUMENTS

| | | | |
|---|---|---|---|
| 6,427,889 B1 * | 8/2002 | Levi | B60R 9/0423 |
| | | | 224/310 |
| 6,764,268 B2 * | 7/2004 | Levi | B60R 9/0423 |
| | | | 224/310 |
| 2007/0175936 A1 * | 8/2007 | Goyanko | B60R 9/042 |
| | | | 224/309 |
| 2014/0169918 A1 * | 6/2014 | Buller | B60P 1/486 |
| | | | 414/462 |
| 2015/0069101 A1 * | 3/2015 | Presley | B60R 9/042 |
| | | | 224/310 |
| 2016/0280114 A1 * | 9/2016 | Baxter, Jr. | B60R 9/08 |
| 2017/0120833 A1 * | 5/2017 | Rudnicki | B60R 9/042 |
| 2017/0341590 A1 * | 11/2017 | McLauchlan | B60R 9/042 |
| 2019/0248295 A1 * | 8/2019 | Müller | B60R 9/0423 |
| 2020/0180515 A1 * | 6/2020 | Dimmen | A47B 88/45 |
| 2020/0247326 A1 * | 8/2020 | Paunov | B60R 9/045 |
| 2022/0355741 A1 * | 11/2022 | Yun | B60R 9/045 |

FOREIGN PATENT DOCUMENTS

| | | |
|---|---|---|
| KR | 10-1186959 B1 | 9/2012 |
| KR | 10-2014-009549 A | 8/2014 |
| KR | 10-2016-0051068 A | 5/2016 |

* cited by examiner (A)

(B)

(A)

(B)

LIFTING MULTI-JOINT ROOF CARRIER FOR VEHICLE

TECHNICAL FIELD

The present invention relates to a carrier installed on the roof of a vehicle such as a car or SUV and to a lifting multi-joint roof carrier for a vehicle, which is used to easily load or unload an object on or from a vehicle roof.

The present invention relates to a lifting multi-joint roof carrier for a vehicle, which is vertically movable up, rotatable, etc. in a process of loading or unloading cargo, to allow an object to be smoothly loaded or unloaded and have a structure with an aesthetically pleasing appearance.

BACKGROUND ART

Recently, as leisure activities using vehicles tend to increase, various sports equipment or leisure goods are loaded on the vehicle in many cases.

A roof carrier is used when a bicycle, a tent, or a roof box is loaded on a roof, or even when a kayak, a rubber boat or the like is loaded on the vehicle roof. Various carriers have been developed to mount the above leisure equipment on a vehicle roof rack. However, when a user needs to fix the leisure equipment to a carrier positioned on the roof, a chair or ladder is required. At this time, accidents may occur. Further, it is very difficult to mount a large cargo. In order to solve the above problems, Korean Unexamined Patent Publication No. 10-2014-0095494 (Published in Aug. 1, 2014; Related art 1) discloses a roof rack carrier in the related art as described below.

The vehicle roof rack in the related art is capable of loading cargoes while descending to a side of the vehicle. The related art includes a roof rack composed of a base rail fixed to a roof of the vehicle, a lever bar pivotally rotated with respect to the base rail, and an arm bar pivotally rotated with respect to the lever bar. According to the above related art, when the arm bar is automatically moved down to the side of the vehicle, the load is loaded onto the arm bar by the user, and then automatically mounted onto the roof again.

However, according to the roof rack in the related art, the lever bar and the arm bar extending from the base rail change lifting positions by the gear and the connection device, and one end of the lever bar pivots at the end of the base rail, so there is a risk that the lever bar may come into contact with a curved portion of the side of the vehicle. In particular, since the above contact may occur especially when the lever bar is directed vertically downward, the load is required to be loaded on the arm bar in a position where the lever bar does not come into contact with the side of the vehicle.

In this case, the arm bar may be placed in a significantly high position, and thus it is difficult to load heavy loads. In addition, since the end of the base rail is required to protrude sufficiently to the outside of the vehicle such that the lever bar is rotated in a vertically downward state without contact with the side of the vehicle, a problem may occur in the appearance. As a result, the roof rack of the prior art has a limit in that long loads such as bicycles are fixed just with one front wheel when installed to be moved toward the rear of the vehicle, and thus it is practically impossible to load various cargoes. Thus, according to the roof rack of the related art, the cargoes are restricted to be lifted via the side of the vehicle.

In order to solve the above problems, the inventor of the present invention has developed a multi-joint roof carrier for a vehicle that can easily load long cargoes even in the rear direction of the vehicle, have a beautiful appearance in the roof position and the unloading position, and be rotated horizontally to load cargoes having various lengths.

DISCLOSURE

Technical Problem

The objective of the present invention is to provide a lifting multi-joint roof carrier for a vehicle to easily unload and load cargoes from a roof position to an unloading position of the vehicle.

The objective of the present invention is to provide a lifting multi-joint roof carrier for a vehicle, in which an upper frame is sealed to a lower frame while mounted on a roof of the vehicle so that a beautiful exterior and a waterproof function are facilitated.

The objective of the present invention is to provide a lifting multi-joint roof carrier for a vehicle, in which an upper frame is equipped with lifting, rotating, and moving functions so that various types of cargoes are loaded.

Technical Solution

In order to solve the above problems, the roof carrier of the present invention includes:
  a lower frame (100) fixed to a vehicle roof and provided at a rear end thereof with a fixed shaft (110);
  an upper frame (200) having a size corresponding to the lower frame to cover the lower frame in a roof position;
  a multi-joint member folded in the roof position and unfolded in an unloading position and including a first support member (300) provided between the lower frame (100) and the upper frame (200), and rotated about the fixed shaft (110), a second support member (400) having a rear end rotatably coupled about a first rotation shaft (330) provided at a front end of the first support member (300), and having a rear side end integrally coupled to a first outer rotation shaft (340) rotatably and concentrically provided on an outer circumference of the first rotation shaft (330), and a third support member (500) having a rear end coupled to a second rotation shaft (430) hinged to a front end of the second support member (400) so as to be integrally rotated;
  a first connection device (320) connected between the fixed shaft (110) and the first rotation shaft (330) and simultaneously connected between the fixed shaft (110) and the outer rotation shaft (340) to rotate the first outer rotation shaft (340) in a same direction as a rotation direction of the first support member (300); and
  a second connection device (420) connected between the first rotation shaft (330) and the second rotation shaft (430) to rotate the second rotation shaft (430) in a direction opposite to the rotation direction of the first support member (300).

Advantageous Effects

The present invention relates to a lifting multi-joint roof carrier mounted on a roof of a vehicle. The carrier can be moved between the roof position and the unloading position, so that loads can be easily transferred from the vehicle rear to the vehicle roof and from the vehicle roof to the vehicle rear.

According to the present invention, interference with curved surfaces of the vehicle side and rear can be prevented during movement from the roof position to the unloading position.

According to the present invention, the upper frame and the lower frame may be configured as a housing structure, so that the multi-joint member provided therein can be prevented from being exposed, external dust or moisture can be blocked, and the roof carrier can have a beautiful exterior while being mounted on the roof of the vehicle.

According to the present invention, the upper frame is rotatable to change the loading direction of the load, so that the loading direction of long cargoes such as bicycles can be changed.

BEST MODE

Figure 1:
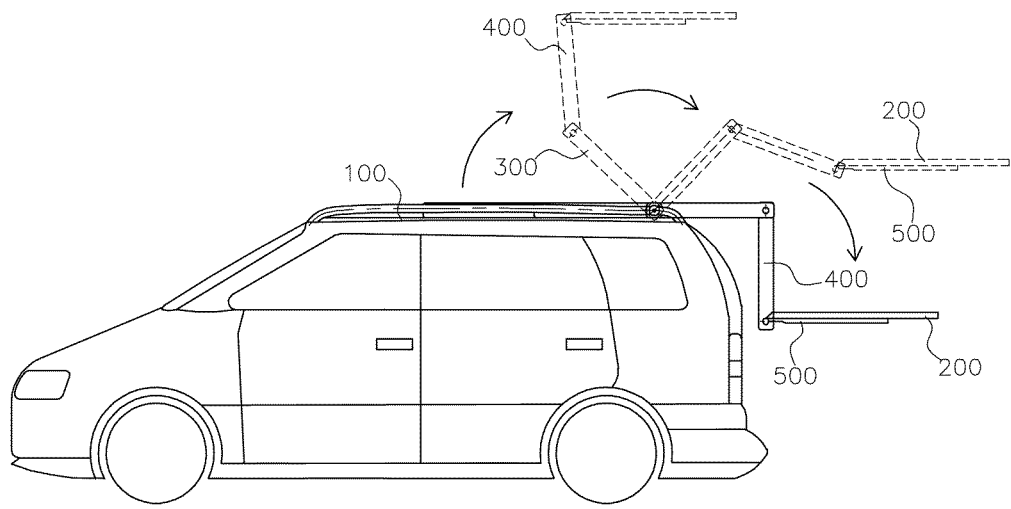
FIG. 1 is an operational conceptual diagram showing a lifting multi-joint roof carrier of a first embodiment according to the present invention.

The ultimate operational form of the lifting multi-joint roof carrier to be obtained by the present invention may be implemented as shown in FIG. 1 of the first embodiment. In other words, a position of an upper frame is movable smoothly from a roof position to an unloading position while a multi-joint member performs actions unfolded and folded on a lower frame fixed to a roof of a vehicle, and a cargo is fixed on the upper frame moved to the unloading position by using fixing device and the cargo is moved back to the roof position of the vehicle. Specifically, the multi-joint member includes a first support member, a second support member, and a third support member. A front end of the first support member is rotated to face a rear of the vehicle, the second support member is rotated toward the ground, and the third supporting member always maintains a horizontal state.

The lifting multi-joint roof carrier for the vehicle of the present invention mainly includes a lower frame 100, a multi-joint member seated on an upper portion of the lower frame 100, and an upper frame 200 seated on an upper portion of the multi-joint member. The upper frame 200 may be preferably composed of a sealed housing together with the lower frame 100 for waterproofing. A fixing device for fixing cargoes is provided on an upper surface of the upper frame 200, and the fixing device may be selected from various types.

Figure 2:
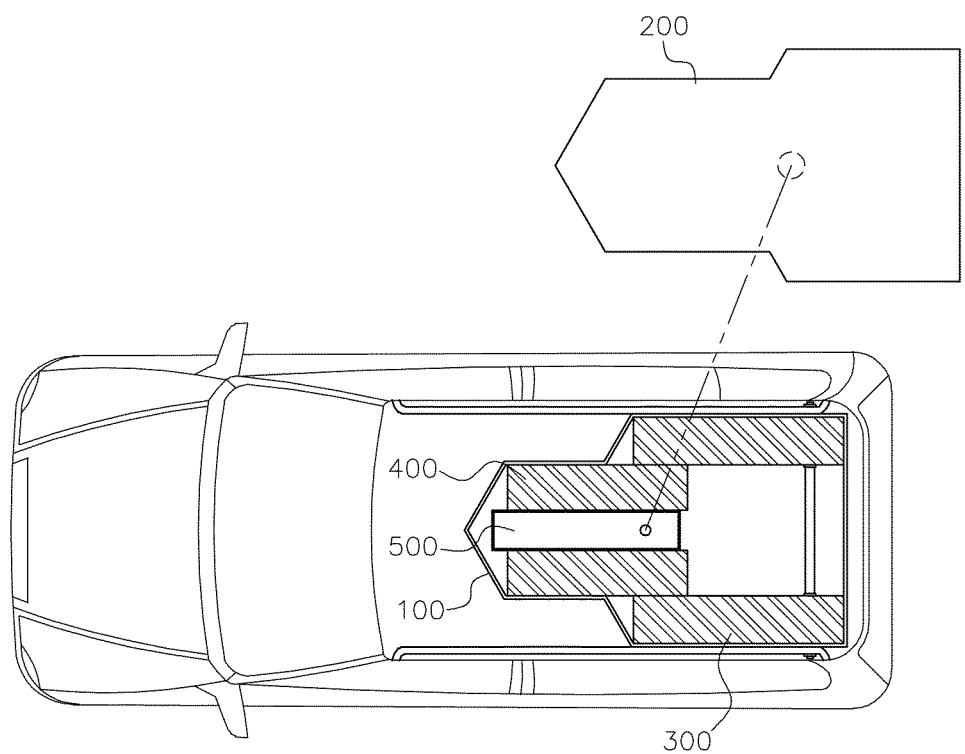
FIG. 2 is a view showing a state in which the lifting multi-joint roof carrier of the first embodiment is installed on a roof.

As shown in FIGS. 1 and 2, the multi-joint member has a multi-joint structure composed of three support members of a first support member 300, a second support member 400, and a third support member 500 continuously connected to each other, in which each support member is arranged in pair such that the pair is symmetrical to both sides. In other words, the first support members 300 are arranged to be rotated with respect to a fixed shaft 110 of the lower frame 100 and arranged in pair on both sides. The pair of second support members 400 are also connected to the pair of first support members 300 so as to be symmetrical, and the third support member is provided between the second support members 400 in the opposite direction.

Alternatively, as shown in FIGS. 12 to 15 as a second embodiment, the multi-joint member may have a multi-joint structure composed of four support members including a first support member 300, a first-1 support member 300', a second support member 400, and a third support member 500.

In the present invention, the structure of the lifting multi-joint roof carrier for performing the basic operation as described above is basically formed in the following configuration as shown in FIGS. 3A and 3B. In other words, the present invention includes:

a lower frame 100 fixed to a vehicle roof and provided at a rear end thereof with a fixed shaft 110;

a multi-joint member 300, 400 and 500 folded in a roof position and unfolded in an unloading position and including a first support member 300 having a rear end rotating about the fixed shaft 110, a second support member 400 having a rear end rotated about a first rotation shaft 330 provided at a front end of the first support member 300, and a third support member 500 having a rear end integrally coupled to a second rotation shaft 430 provided at a front end of the second support member 400;

an upper frame 200 provided parallel to an upper surface of the third support member 500 to cover the lower frame in the roof position with the multi-joint member interposed therebetween; and includes: a first outer rotation shaft 340 provided on an outer circumference of the first rotation shaft 330, rotated independently, and integrally coupled to a rear side end of the second support member;

a first connection device connected between the fixed shaft 110 and the first rotation shaft 330 and between the fixed shaft 110 and the outer rotation shaft 340, respectively; and a second connection device 420 is provided between the first rotation shaft 330 and the second rotation shaft 430.

The first connection device 320 and the second connection device 420 may be selected from various connection devices. However, basically, the first connection device is connected between the fixed shaft 110 and the first rotation shaft 330 and simultaneously connected between the fixed shaft 110 and the outer rotation shaft 340, in which the first outer rotation shaft 340 is selected to be rotated in the same direction as a rotation direction of the first support member 300, and the second connection device 420 is connected between the first rotation shaft 330 and the second rotation shaft 430, in which the second rotation shaft 430 is selected to be rotated in a direction opposite to the rotation direction of the first support member 300.

Preferably, the first connection device 320 is connected between the fixed shaft 110 and the first rotation shaft 330 at the rotation ratio of 1:1, and connected between the fixed shaft 110 and the first outer rotation shaft 340 at the rotation ratio of 1:0.5. The second connection device is connected between the first rotation shaft 330 and the second rotation shaft 430 at the rotation ratio of 1:1.

Hereinafter, the operational principle of the lifting multi-joint roof carrier having the multi-joint structure with the three support members will be described.

The first support member 300 of the multi-joint member is rotatable with respect to the fixed shaft 110 fixed to the rear end of the lower frame 100, in which a drive shaft 301 may be provided concentrically on an outer circumference of the fixed shaft 110, integrally fixedly coupled to one side of the first support member 300, and rotated by an actuator composed of a hydraulic cylinder and a crank mechanism. The actuator may be a hydraulic cylinder and a crank mechanism operated by hydraulic pressure, or composed of a rack and a pinion, or may be a driving motor and a speed reducer, in another form.

The rear end of the second support member 400 is hinged to the front end of the first support member 300 about the first rotation shaft 330, in which the first outer rotation shaft 340 is provided concentrically on the outer circumference of the first rotation shaft 330. The first connection device 320 for connecting the fixed shaft 110 to the first rotation shaft 330 and the first outer rotation shaft 340 is provided to transmit a rotational force when the first support member 300 is rotated around the fixed shaft 110 to the first rotational shaft 330 and the first outer rotational shaft 340 independently. The first connection device 320 may be selected from various connection device such as chains, sprockets, and gears. In the exemplary embodiment, a pair of bevel gears aa', bb' and cc' capable of bearing large loads may be used.

As the first support member 300 is rotated about the fixed shaft 110, the first connection device 320 rotates the first rotation shaft 330 and simultaneously rotates the first outer rotation shaft 340. However, the first rotation shaft 330 and the first outer rotation shaft 340 have rotation amounts different from each other according to the rotation ratio. Since one side of the first outer rotation shaft 340 is integrally coupled to the rear side end of the second support member 400, a rotation angle of the first outer rotation shaft 340 corresponds to a rotation angle of the second support member 400. The rotation ratio of at least three pairs of bevel gears aa', bb' and cc' provided in the first connection device 320 is designed such that the first rotation shaft 330 is rotated with the same rotation amount as the rotation amount of the first support member 300, whereas the first outer rotation shaft 340 is rotated by about ½ compared to the rotation amount of the first support member 300. The rotation amount of the second support member according to the rotation of the first support member is changed by the bevel gear bb'.

FIGS. 3A and 3B show another embodiment with respect to the structure of the first connection device for allowing the rotation direction of the first outer rotation shaft to be the same as that of the first support member.

In other words, the first connection device 320 of FIG. 3A may be provided, in some cases, with a first intermediate gear 350, so that the rotation direction of the first outer rotation shaft 340 is the same as the rotation direction of the first support member 300. Alternatively, as shown in FIG. 3B, the installation structure of the bevel gear may be modified to directly engage the first connection device with the bevel gear bb' of the first outer rotation shaft.

As shown in FIG. 1, an absolute rotation angle of the second support member 400 corresponds to the amount obtained by adding a rotation angle of the first outer rotation shaft to a rotation angle of the first support member 300, that is, a rotation angle of the second support member. In other words, when the first support member 300 is rotated by 90° in a vertical state and directed vertically upward, the second support member 400 is rotated by 45° with respect to the first support member 300, thereby being positioned at 135° as a whole. In addition, when the first support member 300 is rotated by 180° and turns in the opposite direction to a horizontal state, the second support member 400 is rotated by 90° with respect to the first support member 300, thereby turning 270° as a whole and facing the ground which is vertically downward.

The rear end of the third support member 500 is rotatably coupled to the front end of the second support member 400 about the second rotation shaft 430, in which the front end of the third support member 500 is arranged to face the rear end of the second support member 400. The rear end of the third support member 500 is integrally coupled to the second rotation shaft 430 and rotated together with the second rotation shaft.

The first rotating shaft 330 and the second rotating shaft 430 are connected by the second connection device 420. In addition, since the rotation ratio of the bevel gear dd' and the bevel gear ee' of the second connection device is the same, the second rotation shaft 430 is also rotated in the same manner as the first rotation shaft 330 is rotated. However, the second rotation shaft is rotated by the absolute rotation angle of the second support member 400, and rotated in the opposite direction.

Accordingly, when the first support member 300 is rotated by 180° in the opposite direction, the second support member 400 is rotated by 90° to face the ground, and the second rotation shaft 430 is rotated by 270° in the opposite direction with respect to the second support member 400. As a result, the third support member 500 integrally coupled to the second rotation shaft 430 always maintains a horizontal state regardless of the rotation angle of the first support member 300.

Figure 4:
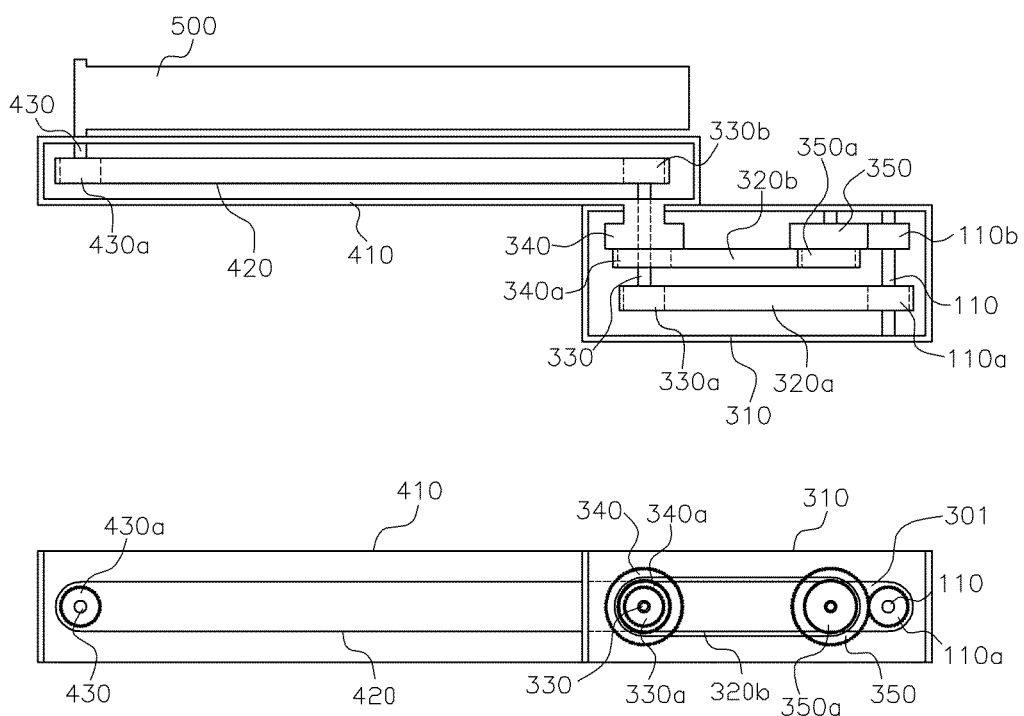
FIG. 4 is a plan view showing a modification of the first embodiment.

FIG. 4 shows a modification of the first embodiment. In the first embodiment, the first connection device 320 may be configured to be divided into a first-a connection device 320a and a first-b connection device 320b. In other words, the fixed shaft 110 and the first rotating shaft 330, the fixed shaft 110 and the first outer rotation shaft 340, and the first rotation shaft 330 and the second rotation shaft 430 are connected by the first-1 connection device 320a, the first-b connection device 320b and the second connection device 420, respectively, and these connection device may be connected by chains and sprockets or other connection device capable of transmitting a rotational force equivalently. At this point, the first rotation shaft 330 and the second rotation shaft 430 have the same rotation direction, but the first-b connection device 320b connected between the fixed shaft 110 and the first outer rotation shaft 340 changes a rotation direction therebetween. Accordingly, a second gear 350 serving as an intermediate gear is provided between the first gear 110b of the fixed shaft 110 and the first outer rotation shaft 340. In other words, the rotation direction is changed while the first gear 110b of the fixed shaft and the second gear 350 serving as the intermediate gear are engaged and rotated with each other, and the second gear 350 and the first outer rotation shaft 340 are connected by the first-b connection device 320b. The other operational principle of the above modification is the same as that of the first embodiment, and will be omitted.

Figure 3:
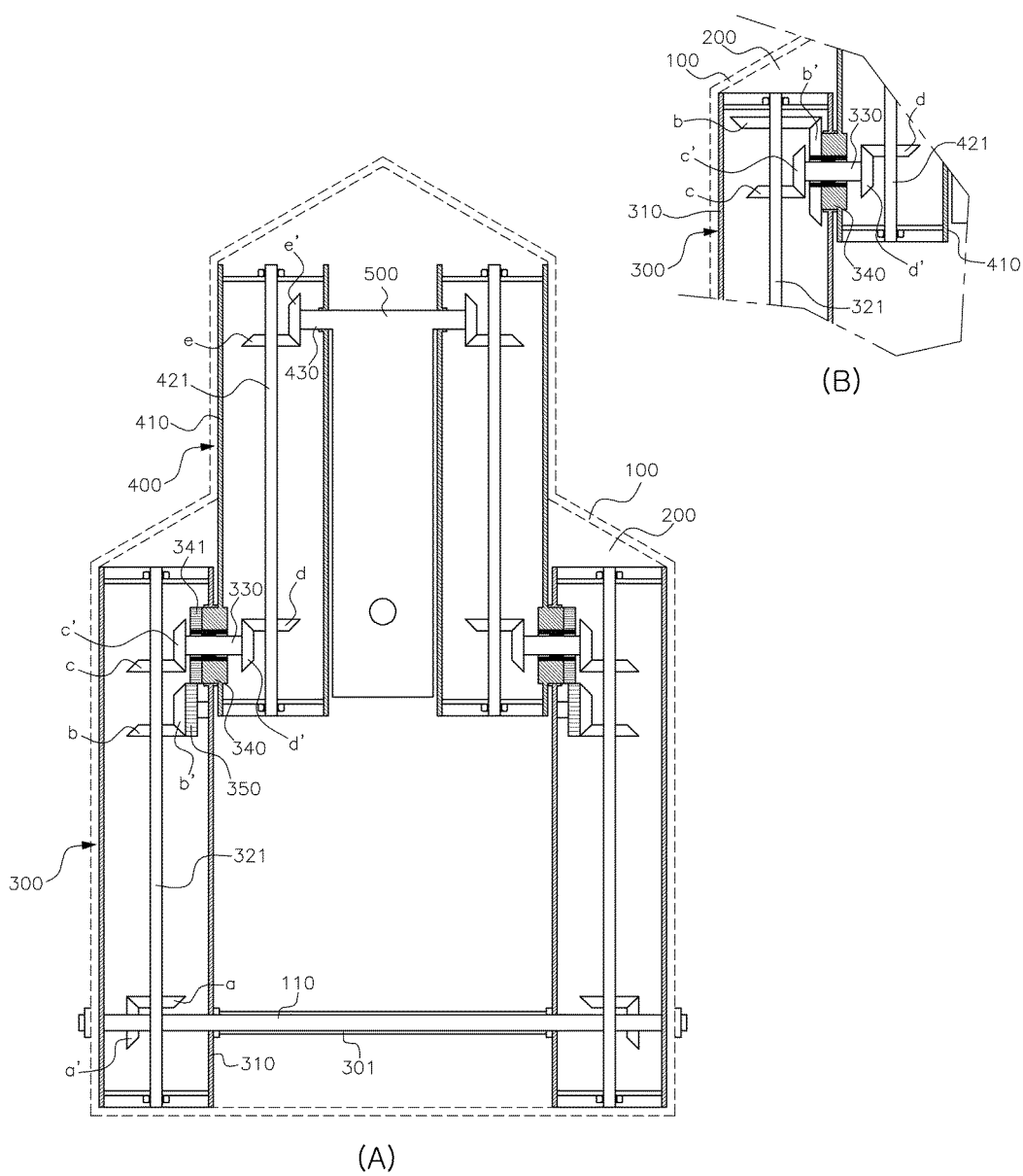
FIGS. 3A and 3B are exemplary views showing internal structures of the lifting multi-joint roof carrier of the first embodiment.
Figure 5:
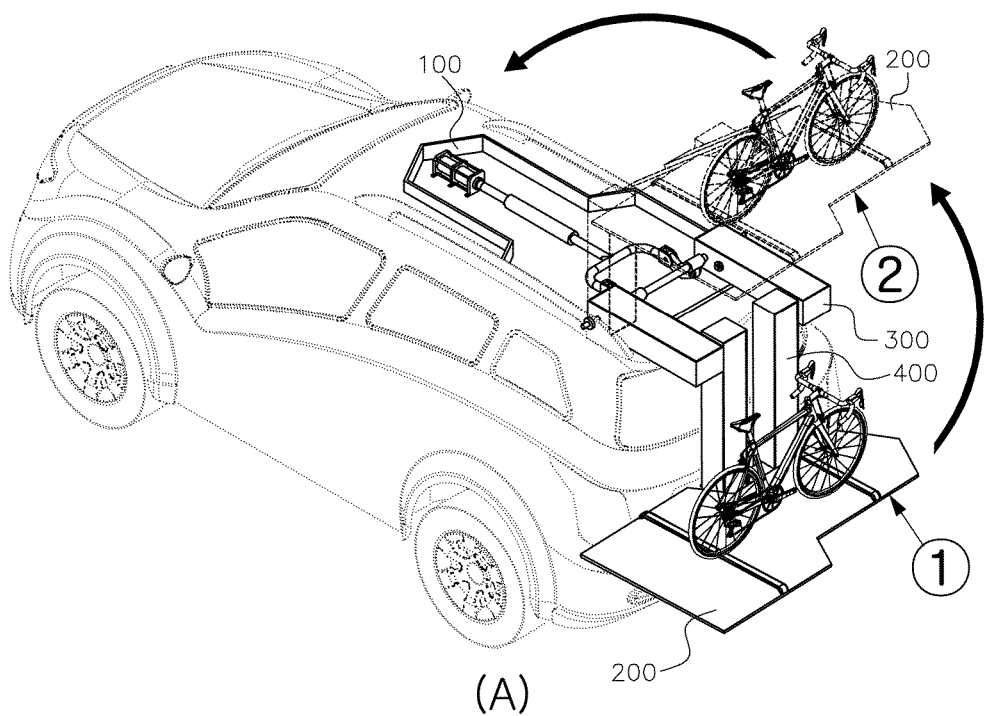
FIG. 5 is a view showing a state in which an upper frame of the lifting multi-joint roof carrier of the first embodiment is rotated.
Figure 5:
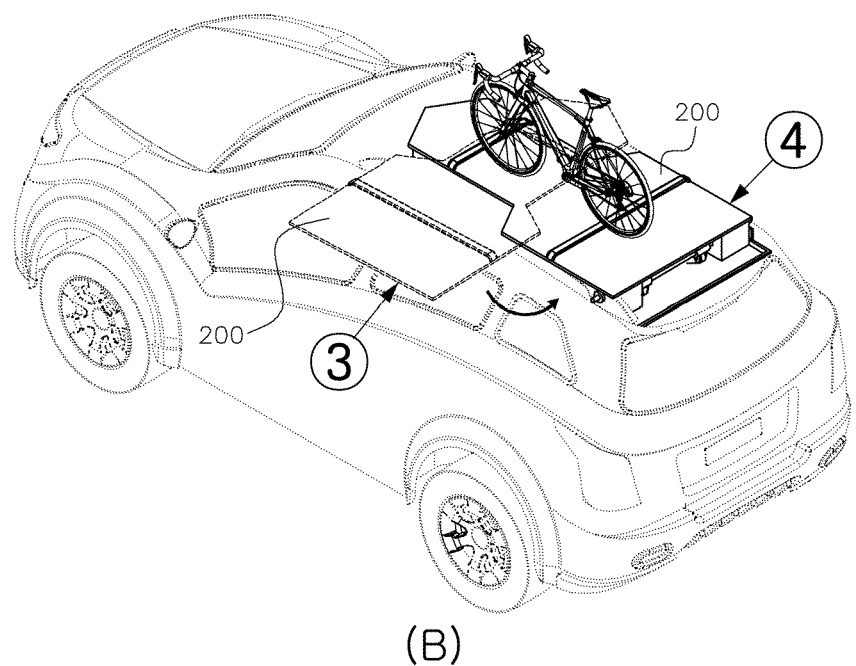

FIG. 5 shows a usage example in which the upper frame 200 is configured to be moved from the roof position to the unloading position and simultaneously rotatable, so that the vehicle may travel while loading even long-form cargoes in the roof position. As also shown in FIGS. 2 and 3, the upper frame may be rotatably coupled to the upper surface of the third support member. Preferably, the upper frame may be rotated on the upper surface of the third support member by a separate driving device.

MODE FOR INVENTION

Figure 6:
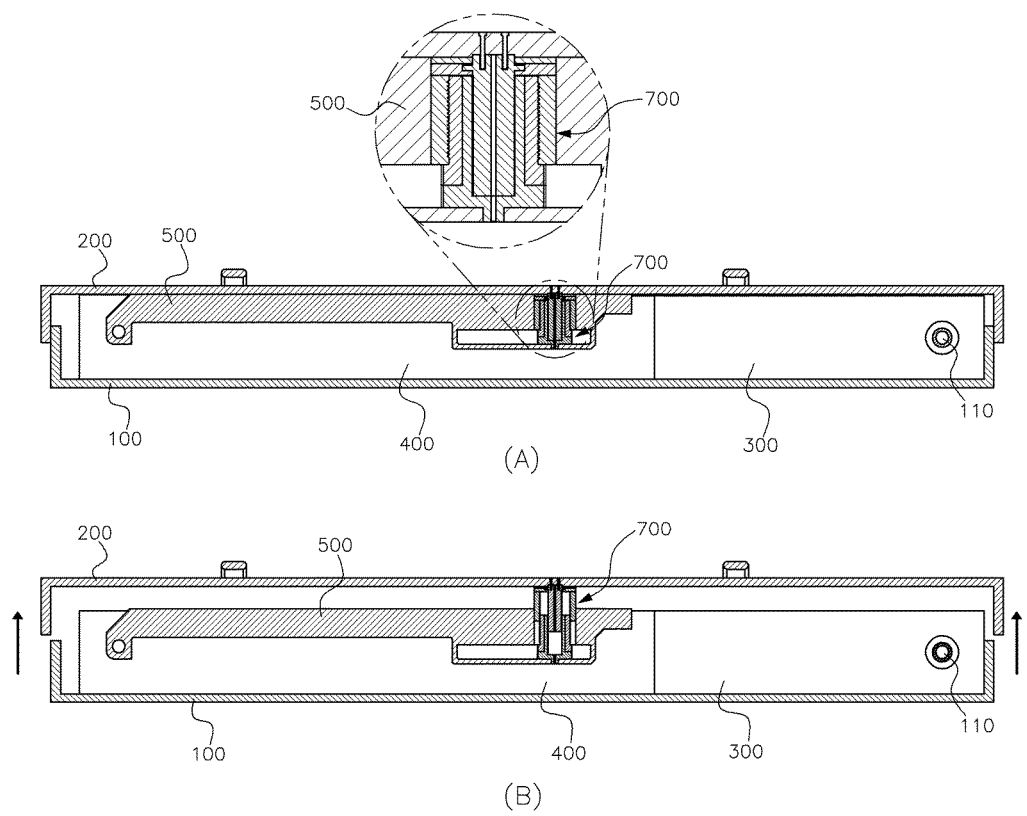
FIG. 6 is a conceptual diagram showing a movable device of the upper frame added to the first embodiment.
Figure 7:
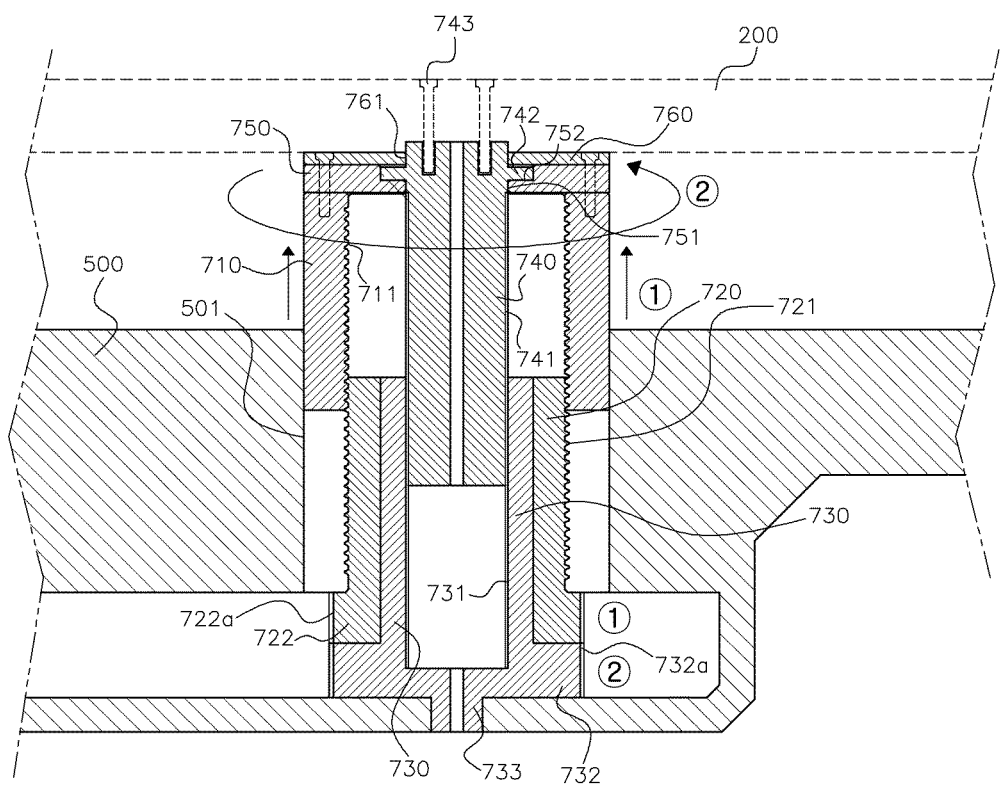
FIG. 7 is a detailed schematic diagram showing the movable device of the upper frame of FIG. 6.
Figure 8:
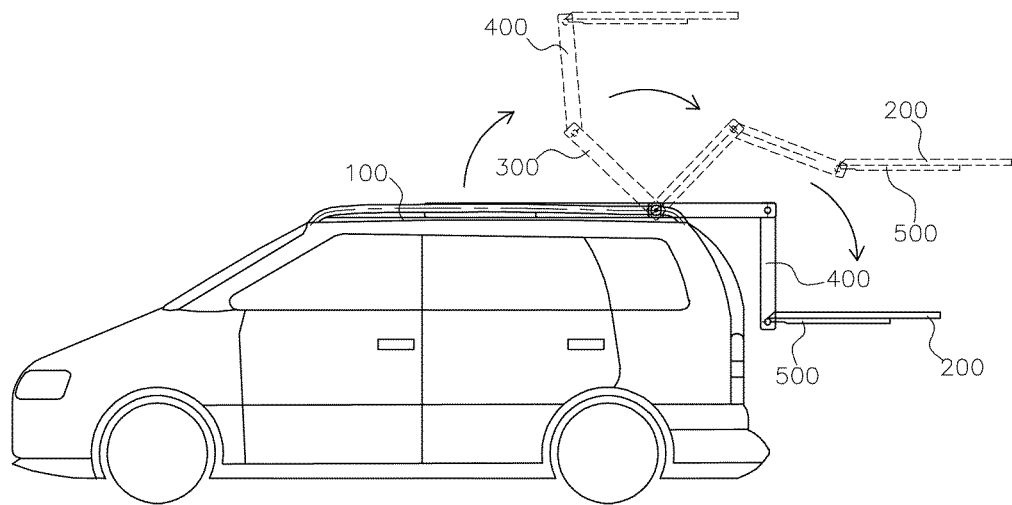
FIG. 8 is a conceptual diagram showing a moving device of the upper frame added to the first embodiment.
Figure 8:
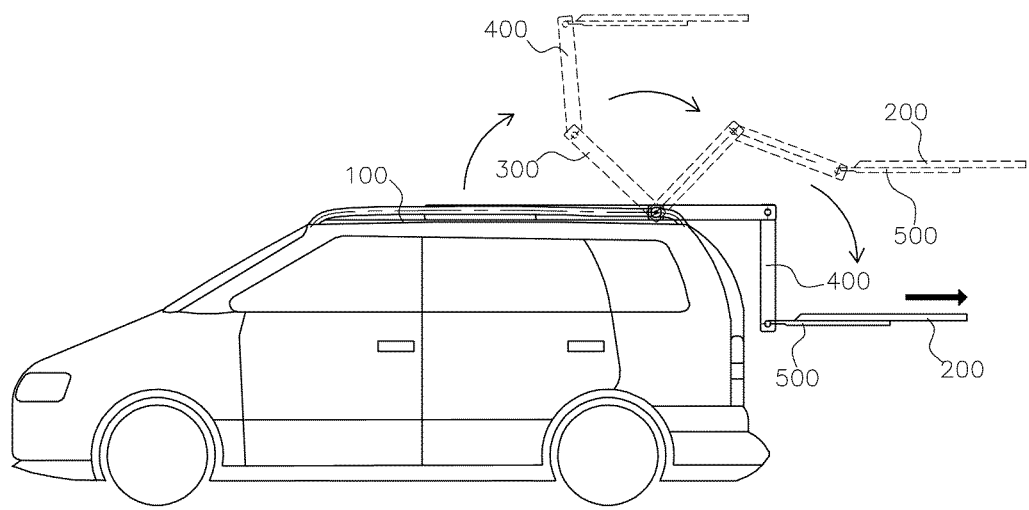

FIGS. 6 and 7 shows that an upper frame movable device 700 may be provided so that the upper frame 200 is installed in a groove 501 of the upper portion of the third support member 500 so as to be rotated or vertically lifted. The upper frame 200 is lifted by the vertical lifting movement of the movable device 700 and safely separated and coupled with respect to the lower frame 100.

Figure 10:
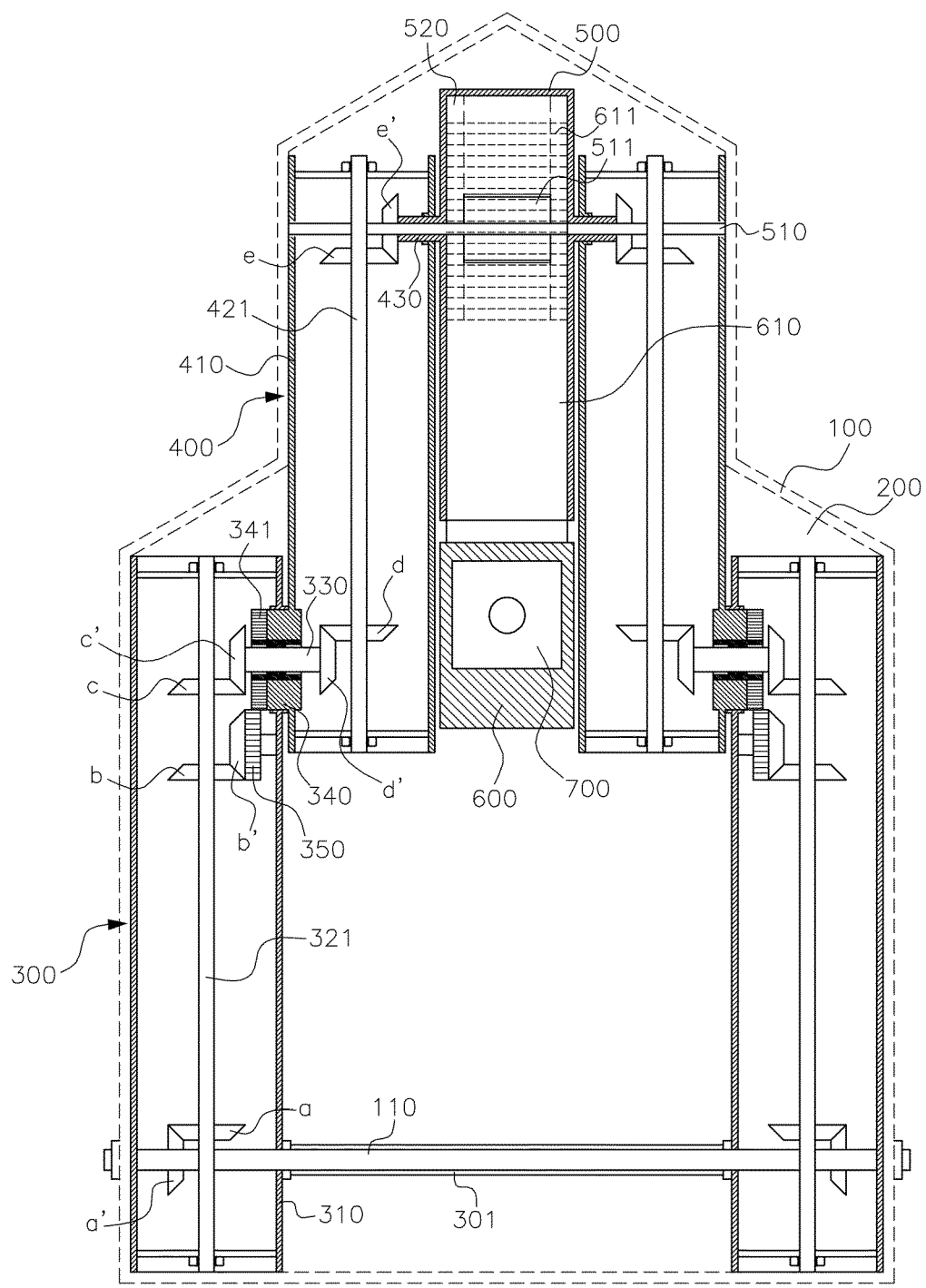
FIG. 10 is a plan view provided with the movable device and the moving device of the upper frame in FIG. 7 and FIG. 9.
Figure 11:
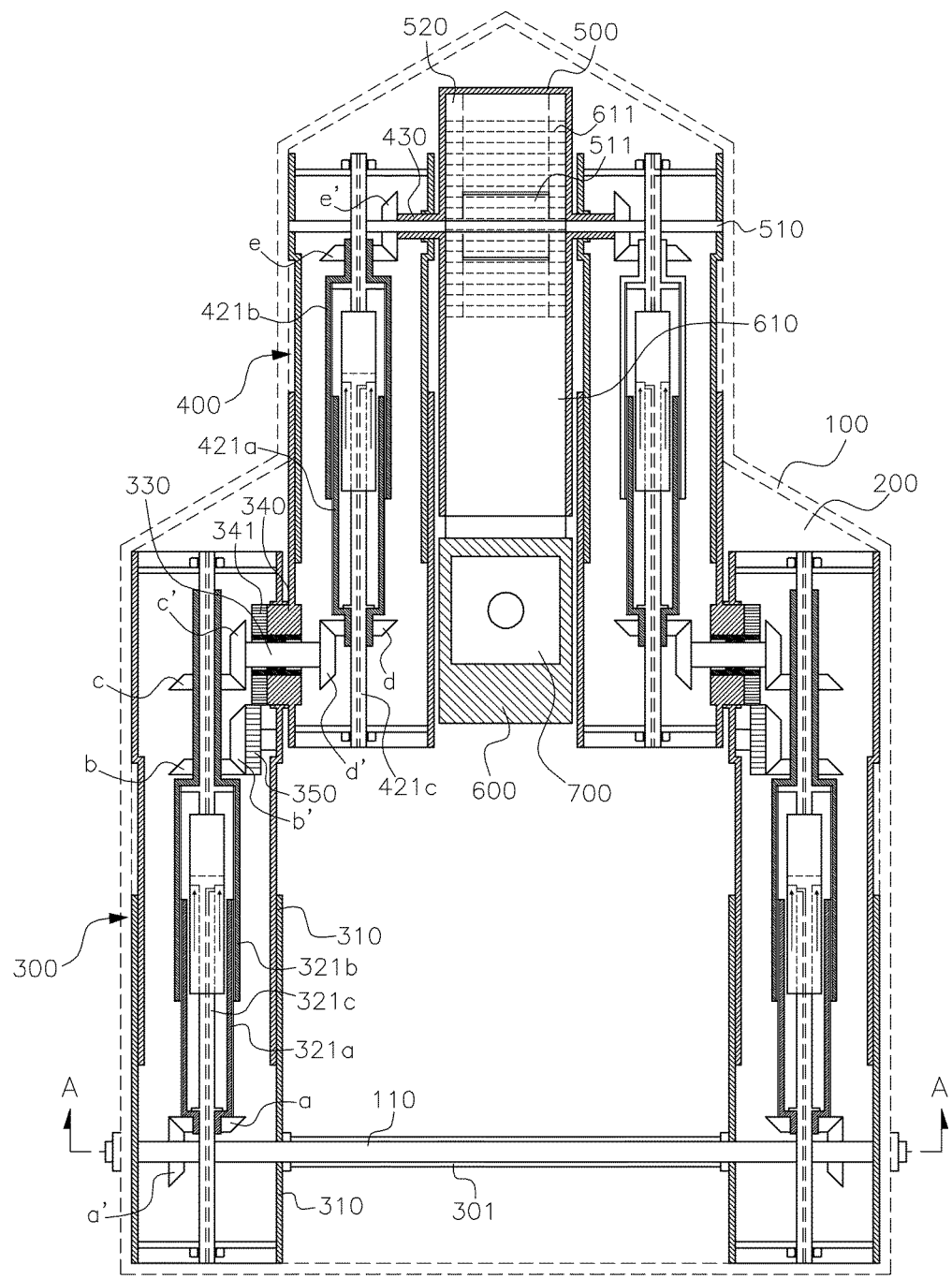
FIG. 11 is a detailed plan view in which an elastic function is added to the first embodiment.

FIG. 7 is an enlarged side sectional view of a structure of the movable device 700. In other words, the movable device 700 may be provided between the third support member 500 and the upper frame 200 and the upper frame 200 may be lifted and rotated together by the lifting and rotating of the movable device 700. The movable device 700 may be coupled through a moving member 600 as shown in FIGS. 10 and 11 instead of the third support member 500.

The groove 501 are vertically formed in the upper surface of the third support member 500, and the movable device 700 is directly mounted inside the groove 501. Specifically, the movable device 700 is provided with a lifting body 710 lifted in the vertical direction without rotation in the groove 501 of the third support member 500. To this end, an inner surface of the recess 501 and an outer surface of the lifting body 710 may be preferably formed in a polygonal shape. A female thread 711 is formed on an inner circumferential surface of a hollow of the elevating body 710, and a rotating body 720 having a male thread 721 formed on an outer surface corresponding to the female thread 711 is screwed with each other. A lower portion of the rotating body 720 is formed with a first lower flange 722, and a first gear 722a is formed on an outer circumference thereof, in which the first gear 722a rotates the rotating body 720 after the rotation amount is adjusted by the driving unit of the actuator, and lifts the corresponding lifting body 710.

Preferably, the first lower flange 722 of the rotating body 720 is seated on a second lower flange 732 of the boss 730 while the boss 730 is inserted into the inside of the rotating body 720.

In addition, the boss 730 freely and rotatably inserted into the hollow of the rotating body 720 is provided, the boss 730 is formed with a second lower flange 732 at the lower portion thereof, and a second gear 732a is formed on an outer circumference thereof. The rotation amount of the second gear 732a is controlled by the driving unit of the actuator. A spline shaft 740, which is spline-coupled, is inserted into an inner circumferential surface of the boss 730, and the boss 730 is rotated by a predetermined angle upon rotation of the second gear 732a and rotates together the spline shaft 740 inserted into the boss 730. In other words, an inner spline 731 is provided on the inner circumferential surface of the boss 730, and an outer spline 741 is formed on an outer circumferential surface of the spline shaft 740. A support flange 742 is provided on an upper outer circumference of the spline shaft 740. A shaft protrusion 733 is provided on a lower end surface of the boss 730 and seated in a through-hole or groove formed on a lower surface of the groove 501.

In addition, a support plate 750 is provided on the upper surface of the lifting body 710, in which a support through-hole 751 is provided in a central portion of the support plate 750 so that the spline shaft 740 passes therethrough, and a support step 752 is formed in the support through-hole 751, so that a support flange 742 formed on the outer circumference of the upper end of the spline shaft 740 is seated thereon. It is provided with a top plate 760 having an insertion through-hole 761 formed in a center portion thereof so that the upper end of the spline shaft 740 passes therethrough, and the lower surface of the upper frame 200 is coupled to the upper surface of the spline shaft 740 by using a bolt 743. The first gear 722a and the second gear 732a are rotated by actuators not shown, respectively, in which the lifting of the upper frame 200 is controlled by the rotation of the first gear 722a, and the rotation of the upper frame 200 is controlled by the rotation of the second gear 732a.

Thus, according to the present invention, the upper frame 200 may be vertically lifted on the third support member 500, and also may be selectively rotated. When the upper frame 200 and the lower frame 100 are coupled together with cases corresponding to each other and overlapped with each other, foreign substances may be prevented from being introduced to the inside from the outside. Accordingly, when the upper frame 200 is necessary to be rotated with respect to the third support member 500, the upper frame 200 is lifted and separated upward from the lower frame 100 and then the upper frame 200 is rotated, so that the rotation is performed without interference.

Figure 9:
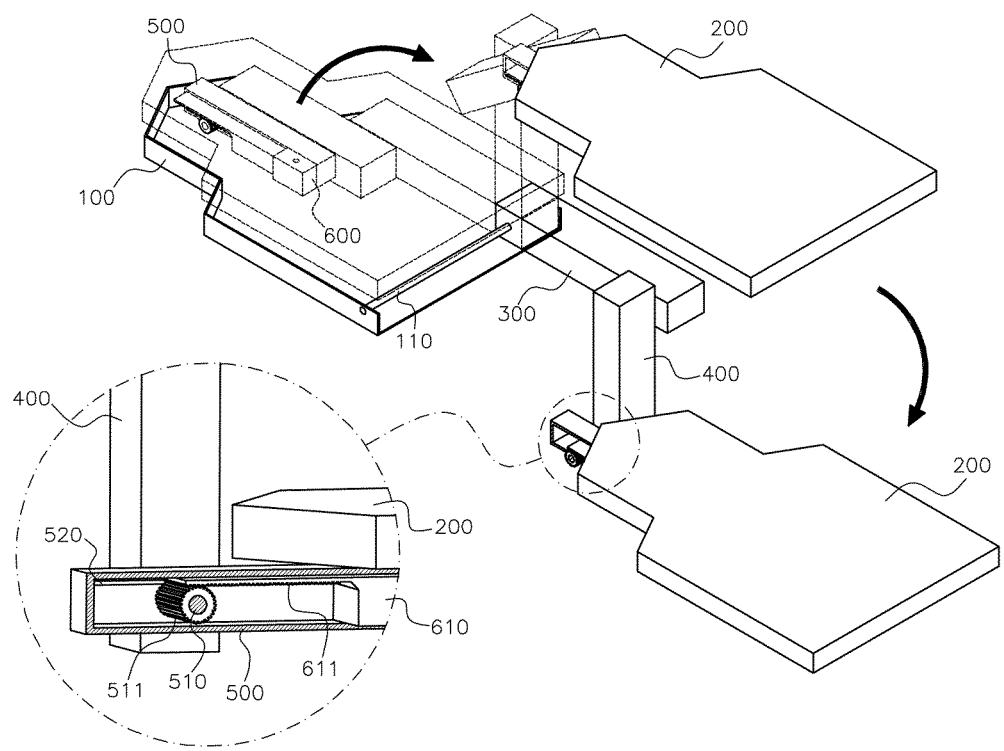
FIG. 9 is a conceptual diagram showing an operation of the upper frame moving device of FIG. 8.

FIG. 9 shows the feature in which, as the multi-joint member is deployed, the upper frame 200 is slid from the upper portion of the third support member 500 and the upper frame 200 is moved outward along the lengthwise direction of the third support member 500.

FIG. 10 shows that the moving member 600 is interposed between the third support member 500 and the upper frame 200, such that the upper frame 200 may reciprocate in the lengthwise direction while being installed horizontally with respect to the third support member. The front end of the second support member 400 is provided with a support shaft 510 disposed concentrically with the second rotation shaft, in which the support shaft 510 is integrally coupled to the second support member 400 and rotated together with the second support member 400. The support shaft 510 has a pinion gear 511 integrally coupled to the inside of the third support member 500, so that the pinion gear 511 is rotated together with the support shaft 510. The pinion gear 511 is engaged with a rack gear 611 formed on an extension 610 of the moving member 600 movable along the lengthwise direction of the third support member 500. The rotation of the pinion gear 511 induces a linear motion of the engaged rack gear 611, and the rack gear 611 reciprocates the moving member 600 inserted and mounted through the open front end of the third support member 500 in the lengthwise direction. Accordingly, the moving member 600 inserted into the third support member 500 is slid in the lengthwise direction along with the rotation of the second support member 400. When the moving member 600 installed with the upper frame 200 is moved in the lengthwise direction along the third support member 500, the upper frame 200 avoids interference with the second support member 400.

FIG. 11 shows another modification of the first embodiment, and shows a structure in which the first support member and the second support member are stretchable in the lengthwise direction. The first support member 300 and the second support member 400 are configured to be stretchable in the longitudinal direction, so that the distance can be easily adjusted in the process of loading and unloading cargoes from the unloading position. Specifically, the first case 310 and the second case 410 are preferably configured as a stretchable double pipe, in which parts of an inner pipe and an outer pipe are configured to overlap each other. A bevel gear a, a bevel gear b, and a bevel gear c are provided at both ends of the first connection shaft 321 provided in the first case 310, in which the first connection shaft 321 is configured to include a double spline pipe 321a and 321b. Spline grooves and protrusions are formed on an outer surface of the inner spline pipe 321a and an inner surface of the outer spline pipe 321b, respectively, thereby expanding and contracting in the lengthwise direction while transmitting the rotational force. A first hydraulic cylinder 321c is accommodated inside the double spline pipe composed of the inner spline pipe 321a and the outer spline pipe 321b to stretch the length of the double spline pipe.

In addition, the structure of the second connection shaft 421 also has the same structure. In other words, the second connection shaft 421 has a double spline structure including an inner spline pipe 421a and an outer spline pipe 421b, in which a bevel gear d and a bevel gear e are provided at both ends, respectively. The double spline pipe is provided therein with a second hydraulic cylinder 421c as a device to be expanded and retracted, and the double spline pipe has a variable length by reciprocation of a second hydraulic cylinder 421c. In addition, the rotational force is transmitted to the second rotation shaft 430 through the bevel gear dd', the second connection shaft 421, and the bevel gear ee', thereby rotating the integrally coupled third support member. The first hydraulic cylinder 321c and the second hydraulic cylinder 421c are controlled as described above, so that the first support member 300 and the second support member 400 are expanded and retracted, thereby being convertible between the roof position and the unloading position.

Figure 12:
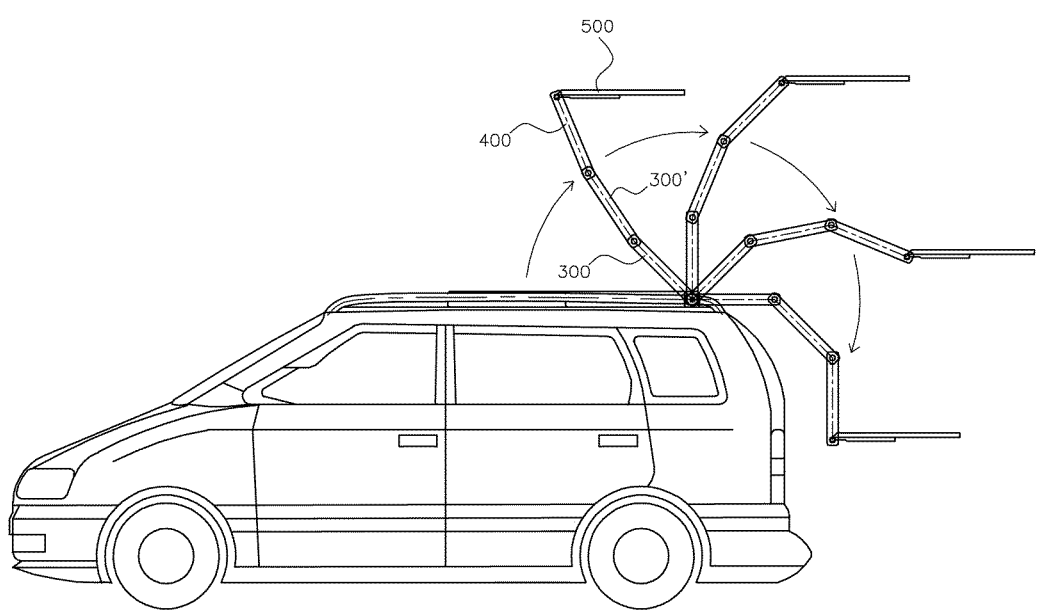
FIG. 12 is an operational conceptual diagram showing a lifting multi-joint roof carrier of a second embodiment according to the present invention.

FIG. 12 shows a multi-joint roof carrier having four joints. This modification further includes a first-1 support member between the first support member and the second support member. The first-1 support member is configured to form an inclined surface at the rear of the vehicle.

Figure 13:
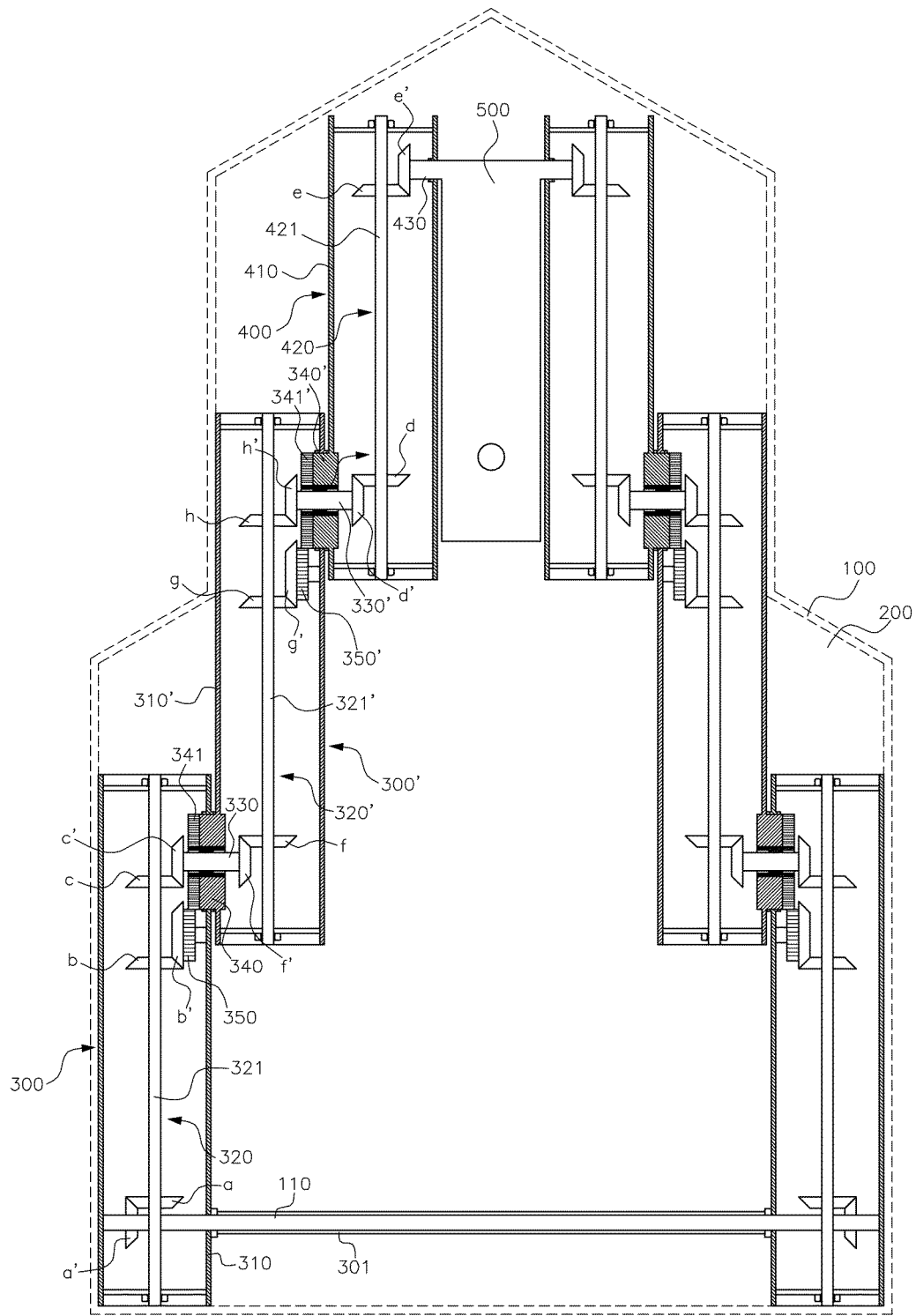
FIG. 13 is a detailed schematic view showing the lifting multi-joint roof carrier of the second embodiment.

FIG. 13 shows, as a second embodiment, a planar structure of the embodiment of a multi-joint roof carrier having four support members.

In other words, the first-1 support member having a structure similar to that of the first support member is interposed between the first support member and the second support member, in which the first rotation shaft 330 is directly connected to the first-1 connection shaft 321', and the first-1 connection shaft 321' is connected to a first-1 rotation shaft 330' and a first-1 outer rotation shaft.

The multi-joint roof carrier of FIG. 13 includes:
a lower frame 100 firmly fixed to a roof of a vehicle to protect the roof of the vehicle; an upper frame 200 having a corresponding shape to cover the lower frame 100; a multi-joint member disposed between the lower frame 100 and the upper frame 200, so that the upper frame 200 is moved with respect to the lower frame 100 upon unfolding and folding of the multi-joint member, wherein
the multi-joint member is configured by connecting:
a fixed shaft 110 fixedly coupled to the lower frame 100; a first support member 300 having a rear end rotatably coupled to the fixed shaft 110; a first-1 support member 300' having a rear end rotatably coupled about a first rotation shaft 330 provided at a front end of the first support member 300; a second support member 400 having a rear end rotatably coupled about a first-1 rotation shaft 330' provided at the front end of the first-1 support member 300'; and a third support member 500 having a rear end integrally and fixedly coupled to the second rotation shaft 430 provided at the front end of the second support member 400 so as to be integrally rotated; and
includes: a first outer rotation shaft 340 rotated concentrically on an outer circumference of the first rotation shaft 330 and integrally coupled to a rear side surface of the first-1 support member 300'; a first-1 outer rotation shaft 340' rotated concentrically on an outer circumference of the first-1 rotation shaft 330' and integrally coupled to a rear side surface of the second support member 400; a first connection device 320 for transmitting a rotational force from the fixed shaft 110 to the first rotating shaft 330 and the first outer rotating shaft 340, respectively; a first-1 connection device 320' for transmitting the rotational force from the first rotation shaft 330 to the first-1 rotation shaft 330' and the first-1 outer rotation shaft 340', respectively; and a second connection device 420 for transmitting the rotational force from the first-1 rotation shaft 330' to the second rotation shaft 430.

However, the first connection device 320 is connected between the fixed shaft 110 and the first rotation shaft 330 and simultaneously connected between the fixed shaft 110 and the first outer rotation shaft 340, in which the first outer rotation shaft 340 is rotated in the same direction as the rotation direction of the first support member 300.

The first-1 connection device 320' is connected between the first rotating shaft 330 and the first-1 rotating shaft 330' and simultaneously connected between the first rotating shaft 330 and the first-1 outer rotating shaft 340', in which the first-1 outer rotation shaft 340' is rotated in the same direction as the rotation direction of the first support member.

The second connection device 420 is connected between the first-1 rotation shaft 330' and the second rotation shaft 430, in which the second rotation shaft 430 is rotated in a direction opposite to the rotation direction of the first support member 300.

The operational scheme will be described in detail. According to the present invention, when the first support member 300 is rotated about the fixed shaft 110, the rotational force is transmitted to the first rotation shaft 330, the first-1 support member 300', the first-1 rotation shaft 330', the second support member 400, the second rotation shaft 430, the third support member 500. Preferably, the rotational force is transmitted to at least one of the first connection device 320, the first-1 connection device 320', and the second connection device 420 by each connection shaft 321, 321' and 421 and each bevel gear aa', bb', cc', ff', gg', hh', dd', and ee'.

Further, the bevel gears provided to transmit the rotational force between the fixed shaft 110, the first connection shaft 321, the first rotation shaft 330, the first-1 connection shaft 321', the first-1 rotation shaft 330', the second connection shaft 421, and the second rotation shaft 430 have the rotation ratio of 1:1 with each other.

It is preferable that the rotation ratio between the first connection shaft 321 and the first outer rotation shaft 340 may be about 1:0.25, and the rotation ratio between the first-1 connection shaft 321' and the first-1 outer rotation shaft 340' may be about 1:0.2. Preferably, a first intermediate gear 350 may be provided to change the rotation direction of the first-1 support member 300', and a first-1 intermediate gear 350' may be provided to change the rotation direction of the second support member 400. Due to the first intermediate gear 350, the direction of rotation may be changed, and the rotation ratio may be decelerated stepwise in two stages of 1:0.5 and 1:0.5. In addition, the first-1 intermediate gear 350' may also change the rotation direction and gradually decelerate stepwise the rotation ratio of 1:0.5 and 1:0.4.

When the first support member 300 is rotated by 180°, the first-1 support member 300' is rotated at an absolute angle of 225° to form a downward inclination, and the second support member 400 is rotated at an absolute angle of 270° so that the end faces the ground. At this point, the first-1 support member 300' and the second support member 400 is not necessarily accurately rotated by 45° and 90° in the rear direction of the vehicle. It is preferable even when the angle is slightly different as long as there is no inconvenience in loading and unloading cargoes.

Figure 14:
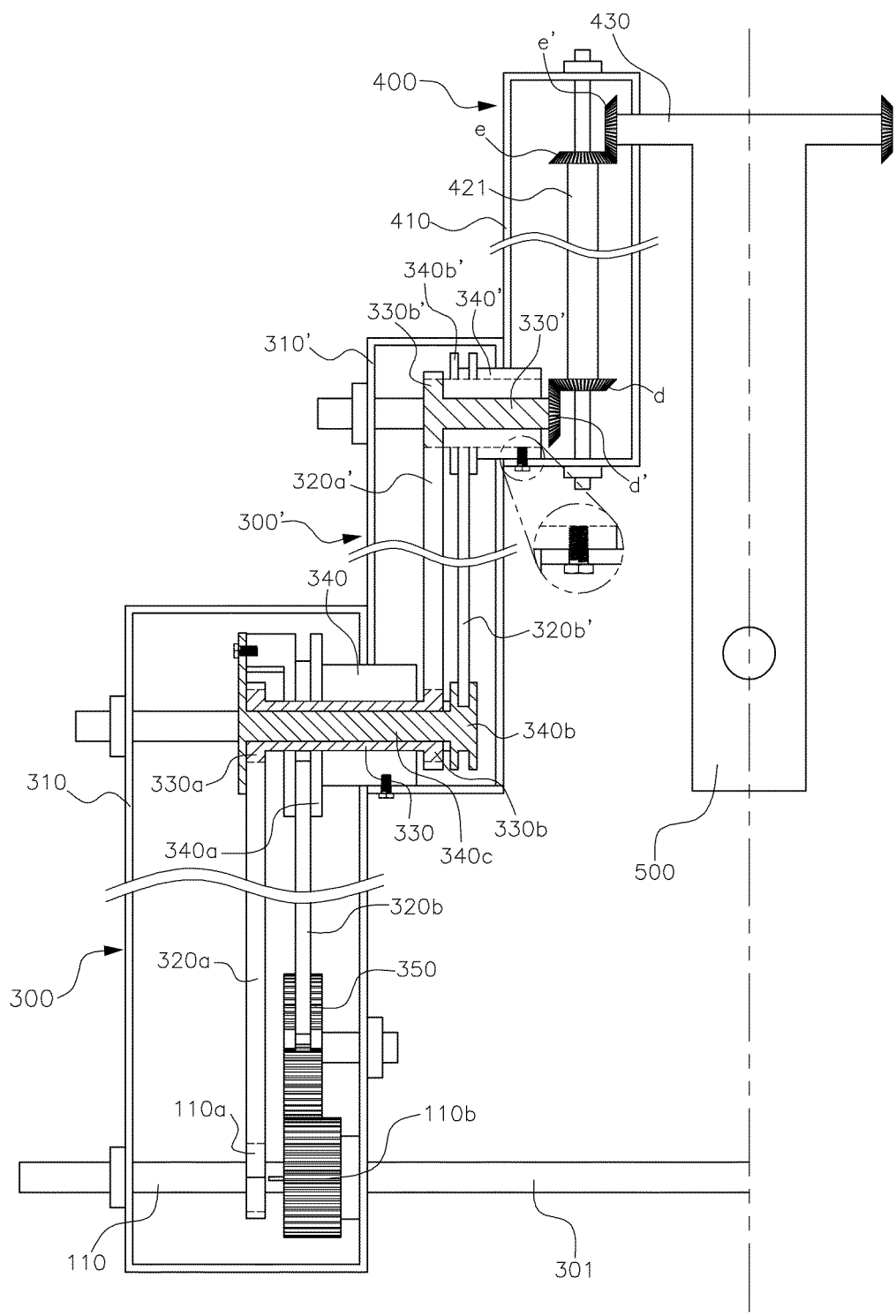
FIG. 14 is a view showing a modification of the lifting multi-joint roof carrier of the second embodiment.

Referring to the four-joint roof carrier of FIG. 14 as another modification, the first support member may be connected from the fixed shaft 110 to the first rotation shaft 330 and the first outer rotation shaft 340 by a belt or a link. The first outer rotation shaft 340 is connected to the first-1 outer rotation shaft 340' through the first-1b connection device 320b' while being integrally and rotatably coupled to the first inner rotation shaft 340c.

However, the intermediate gear 350 is provided between the fixed shaft 110 and the first outer rotation shaft 340 to change the rotation direction. In addition, the first outer rotating shaft 340 provided concentrically on the outer circumference of the first rotating shaft 330 is also rotatably and integrally coupled to one side of the first inner rotation shaft 340c concentrically provided on the inner circumference of the first rotation shaft 330, and the other side of the first inner rotation shaft 340c is connected by a first-1b connection device 320b' to rotate the first-1 outer rotation shaft 340' of the first-1 support member 300'. The first-1 outer rotation shaft 340' is integrally coupled to the rear side surface of the second support member. The first rotating shaft 330 of the first support member 300 is directly connected to the first-1 rotating shaft 330' of the first-1 support member 300' by a belt or the like. In addition, the first outer rotation shaft 340 and the first-1 outer rotation shaft 340b' are also connected by a belt or link to transmit the rotational force. The other configurations are the same as those of the second embodiment of FIG. 13.

Figure 15:
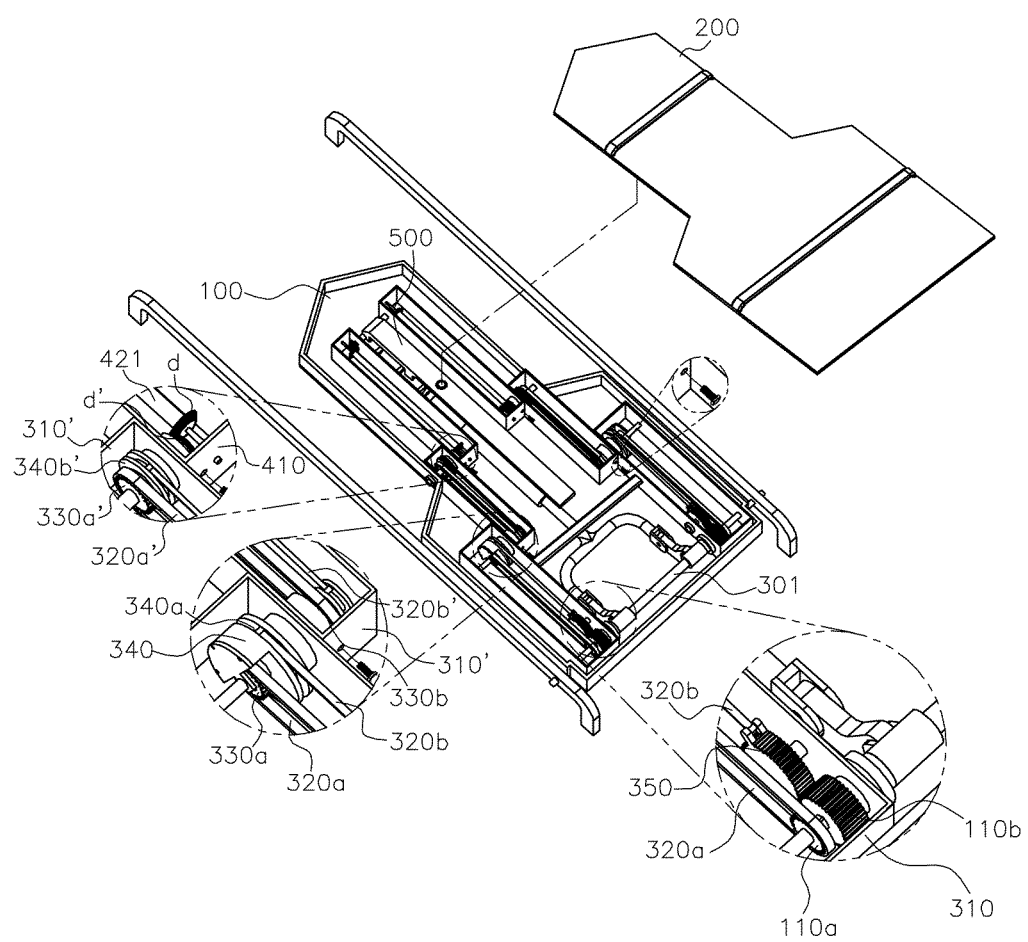
FIG. 15 is a perspective view of the lifting multi-joint roof carrier.

Accordingly, the roof carrier of FIGS. 14 and 15 showing the modification of the second embodiment includes:

a lower frame 100 firmly fixed to a roof of a vehicle to protect the roof of the vehicle; a fixed shaft 110 fixedly coupled to the lower frame 100; a first support member 300 having a rear end rotatably coupled to the fixed shaft 110 by an actuator; a first-1 support member 300' having a rear end rotatably coupled about a first rotation shaft 330 provided at a front end of the first support member 300, and having a rear side end integrally coupled to a first outer rotation shaft 340 rotatably and concentrically provided on an outer circumference of the first rotation shaft 330; a second support member 400 having a rear end rotatably coupled about a first-1 rotation shaft 330' provided at the front end of the first-support member 300', and having a rear side end integrally coupled to a first-1 outer rotation shaft 340 rotatably and concentrically provided on an outer circumference of the first-1 rotation shaft 330'; a third support member 500 having a rear end rotatably coupled about a second rotation shaft 430 provided at a front end of the second support member 400, and integrally coupled to the second rotation shaft 430; and an upper frame 200 seated in parallel to an upper surface of the third support member 500, and includes:

a first inner rotation shaft 340c rotated concentrically on an inner circumference of the first rotation shaft 330, and coupled to be integrally rotated with the first outer rotation shaft 340, in which the first support member 300 includes a first-a connection device 320a connected between the fixed shaft 110 and the first rotation shaft 330, and a first-b connection device 320b connected between the fixed shaft 110 and the first outer rotating shaft 340 to rotate the first outer rotating shaft 340 in the same direction as the first support member 300, the first-1 support member 300' includes a first-1a connection device 320a' connected between the first rotation shaft 330 and the first-1 rotation shaft 330', and a first-1b connection device 320b' connected between the first inner rotation shaft 340c and the first-1 outer rotation shaft 340', and the second support member 400 includes a second connection device 420 connected between the first-1 rotation shaft 330' and the second rotation shaft 430.

The first-a connection device 320a, the first-b connection device 320b, the first-1a connection device 320a', and the first-1b connection device 320b' may be selectively used from among devices for transmitting the rotational force obvious to those skilled in the art. However, the intermediate gear 350 may be inserted between the fixed shaft and the first outer rotation shaft to change the rotation direction.

INDUSTRIAL APPLICABILITY

The present invention relates to a roof carrier for a vehicle for easily loading and unloading cargoes on or from a vehicle roof, and has the industrial applicability.

The invention claimed is:

1. A lifting multi-joint roof carrier for a vehicle, the lifting multi-joint roof carrier comprising:
a lower frame (100) fixed to a roof of the vehicle and provided at a rear end thereof with a fixed shaft (110);
an upper frame (200) having a size corresponding to the lower frame to cover the lower frame in a roof position;
a multi-joint member provided between the lower frame (100) and the upper frame (200), folded in the roof position and unfolded in an unloading position, and including a first support member (300) rotated about the fixed shaft (110), a second support member (400) having a rear end rotatably coupled about a first rotation shaft (330) provided at a front end of the first support member (300), and having a rear side end integrally coupled to a first outer rotation shaft (340) rotatably and concentrically provided on an outer circumference of the first rotation shaft (330), and a third support member (500) having a rear end coupled to a second rotation shaft (430) hinged to a front end of the second support member (400) so as to be integrally rotated;

a first connection device (320) connected between the fixed shaft (110) and the first rotation shaft (330) and simultaneously connected between the fixed shaft (110) and the outer rotation shaft (340) to rotate the first outer rotation shaft (340) in a same direction as a rotation direction of the first support member (300); and a second connection device (420) connected between the first rotation shaft (330) and the second rotation shaft (430) to rotate the second rotation shaft (430) in a direction opposite to the rotation direction of the first support member (300).

2. The lifting multi-joint roof carrier of claim 1, wherein the first connection device (320) has a first connection shaft (321) disposed in a lengthwise direction on the first support member (300), in which the first connection shaft (321) and the fixed shaft (110) include bevel gears (aa') connected to each other, bevel gears (cc') connected between the first connection shaft (321) and the first rotation shaft (330), and bevel gears (bb') connected between the first connection shaft (321) and the first outer rotation shaft (340).

3. The lifting multi-joint roof carrier of claim 1, wherein the first connection device (320) includes a first-a connection device (320a) connected between the fixed shaft (110) and the first rotation shaft, and a first-b connection device (320b) connected between the fixed shaft (110) and the first outer rotation shaft, in which the first-a connection device or the first-b connection device is configured as a sprocket and a chain.

4. The lifting multi-joint roof carrier of claim 1, wherein the first connection device (320) is connected between the fixed shaft (110) and the first rotation shaft (330) at a rotation ratio of 1:1 and connected between the fixed shaft (110) and the first outer rotation shaft (340) at a rotation ratio of 1:0.5, and the second connection device is connected between the first rotation shaft (330) and the second rotation shaft (430) at a rotation ratio of 1:1.

5. The lifting multi-joint roof carrier of claim 1, wherein a second connection shaft (421) has a double spline structure including an inner spline pipe (421a) and an outer spline pipe (421b), in which the double spline pipe is provided therein with a second hydraulic cylinder (421c) as a device to be expanded and retracted, and the double spline pipe has a variable length by reciprocation of the second hydraulic cylinder (421c).

6. The lifting multi-joint roof carrier of claim 1, further comprising:

a moving member (600) slid and moved in a lengthwise direction with respect to the third support member (500), wherein the upper frame (200) includes a horizontal moving device coupled to an upper surface of the moving member (600) to reciprocate the moving member (600) in the lengthwise direction of the third support member (500), so that interference between the upper frame (200) and the second support member (400) is avoided.

7. The lifting multi-joint roof carrier of claim 6, wherein the horizontal moving device includes:

a rack gear (611) provided on a rear end extension (610) of the moving member (600) so as to be inserted, slid and moved in the lengthwise direction through an open front end of the third support member (500);

a support shaft (510) integrally formed with the second support member (400); and a pinion gear (511) installed inside the third support member (500) so as to be rotated integrally with the support shaft (510).

8. The lifting multi-joint roof carrier of claim 7, wherein a movable device (700) is provided in a groove (601) of an upper surface of the moving member (600) to rotate or lift the upper frame (200), in which the upper frame (200) is seated and coupled to an upper end surface of the movable device (700), so that the upper frame (200) is rotated or lifted at the upper surface of the moving member (600) upon operation of the movable device (700).

9. The lifting multi-joint roof carrier of claim 8, wherein the movable device (700) includes:

a lifting body (710) formed on an inner circumferential surface thereof with a female thread (711) and having a structure vertically lifted without being rotated in the groove (501 and 601);

a rotating body (720) formed on an outer surface thereof with a male thread (721) to be screwed with the female thread (711) formed on an inner surface of a hollow of the lifting body (710), and having a first lower flange (722) formed on an outer circumferential surface thereof with a first gear (722a) for driving;

a boss (730) rotatably inserted into a hollow of the rotating body (720), having a second lower flange (732) formed on an outer circumferential surface thereof with a second gear (732a) for driving, and formed on a hollow inner surface thereof with an inner spline (731); and a spline shaft (740) formed on an outer surface thereof with an outer spline (741) inserted into the inner spline (731), and further includes:

a support plate (750) seated on an upper surface of the lifting body (710), formed in a central portion thereof with a support through-hole (751) through which the spline shaft (740) passes, and having a support step (752) formed on an outer circumference of the support through-hole (751) so that a support flange (742) formed on an upper outer circumference of the spline shaft (740) is seated; and a top plate (760) seated on an upper portion of the support plate (750) and formed in a central portion thereof with an insertion through-hole (761) through which an upper end of the spline shaft (740) passes, and wherein a lower surface of the upper frame (200) is fastened to an upper surface of the spline shaft (740), so that the upper frame is lifted and rotated.

10. The lifting multi-joint roof carrier of claim 1, wherein a movable device (700) is provided in a groove of an upper surface of the third support member (500) to rotate or lift the upper frame, in which the movable device (700) has a body inserted and fixed to the groove of the third support member (500) or a groove of a moving member (600), and the upper frame (200) is seated and coupled to an upper end surface of the movable device (700), so that the upper frame (200) is rotated or lifted at an upper surface of the third support member (500) upon operation of the movable device (700).

11. The lifting multi-joint roof carrier of claim 10, wherein the movable device (700) includes:

a lifting body (710) formed on an inner circumferential surface thereof with a female thread (711) and having a structure vertically lifted without being rotated in a groove (501 and 601);

a rotating body (720) formed on an outer surface thereof with a male thread (721) to be screwed with the female thread (711) formed on an inner surface of a hollow of the lifting body (710), and having a first lower flange (722) formed on an outer circumferential surface thereof with a first gear (722a) for driving;

a boss (730) rotatably inserted into a hollow of the rotating body (720), having a second lower flange (732) formed on an outer circumferential surface thereof with a second gear (732a) for driving, and formed on a hollow inner surface thereof with an inner spline (731); and a spline shaft (740) formed on an outer surface thereof with an outer spline (741) inserted into the inner spline (731), and further includes:

a support plate (750) seated on an upper surface of the lifting body (710), formed in a central portion thereof with a support through-hole (751) through which the spline shaft (740) passes, and having a support step (752) formed on an outer circumference of the support through-hole (751) so that a support flange (742) formed on an upper outer circumference of the spline shaft (740) is seated; and a top plate (760) seated on an upper portion of the support plate (750) and formed in a central portion thereof with an insertion through-hole (761) through which an upper end of the spline shaft (740) passes, and wherein a lower surface of the upper frame (200) is fastened to an upper surface of the spline shaft (740), so that the upper frame is lifted and rotated.

* * * * *